US006833527B2

(12) United States Patent
Pollard

(10) Patent No.: US 6,833,527 B2
(45) Date of Patent: Dec. 21, 2004

(54) SLOTTED SUBSTRATES AND METHODS AND SYSTEMS FOR FORMING SAME

(75) Inventor: Jeffrey R. Pollard, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/357,910

(22) Filed: Feb. 4, 2003

(65) Prior Publication Data

US 2004/0017438 A1 Jan. 29, 2004

Related U.S. Application Data

(62) Division of application No. 10/205,959, filed on Jul. 26, 2002, now Pat. No. 6,540,337.

(51) Int. Cl.[7] .............................. B41J 2/05; C23F 1/00; B23K 26/36

(52) U.S. Cl. ...................... 219/121.69; 216/2; 29/890.1

(58) Field of Search ....................... 219/121.67, 121.68, 219/121.69, 121.72, 121.85; 347/65; 216/2; 257/466; 438/21; 29/890.1

(56) References Cited

U.S. PATENT DOCUMENTS 5,317,346 A 5/1994 Garcia
6,019,457 A 2/2000 Silverbrook

FOREIGN PATENT DOCUMENTS

EP 0895866 11/2001
GB 2384751 8/2003

OTHER PUBLICATIONS

GB0316791.3 Search Report dated Jan. 14, 2004.

*Primary Examiner*—Samuel M. Heinrich

(57) ABSTRACT

Methods and systems for forming slots in a print head substrate having a thickness defined by opposing first and second surfaces. In one exemplary embodiment, a trench is received in the first surface and extends through less than an entirety of the thickness of the substrate. A plurality of slots extends into the substrate from the second surface and connects with the trench to form a compound slot through the substrate. In this embodiment, the trench is wider at portions proximate to said slots than at portions more distant to said slots.

22 Claims, 9 Drawing Sheets

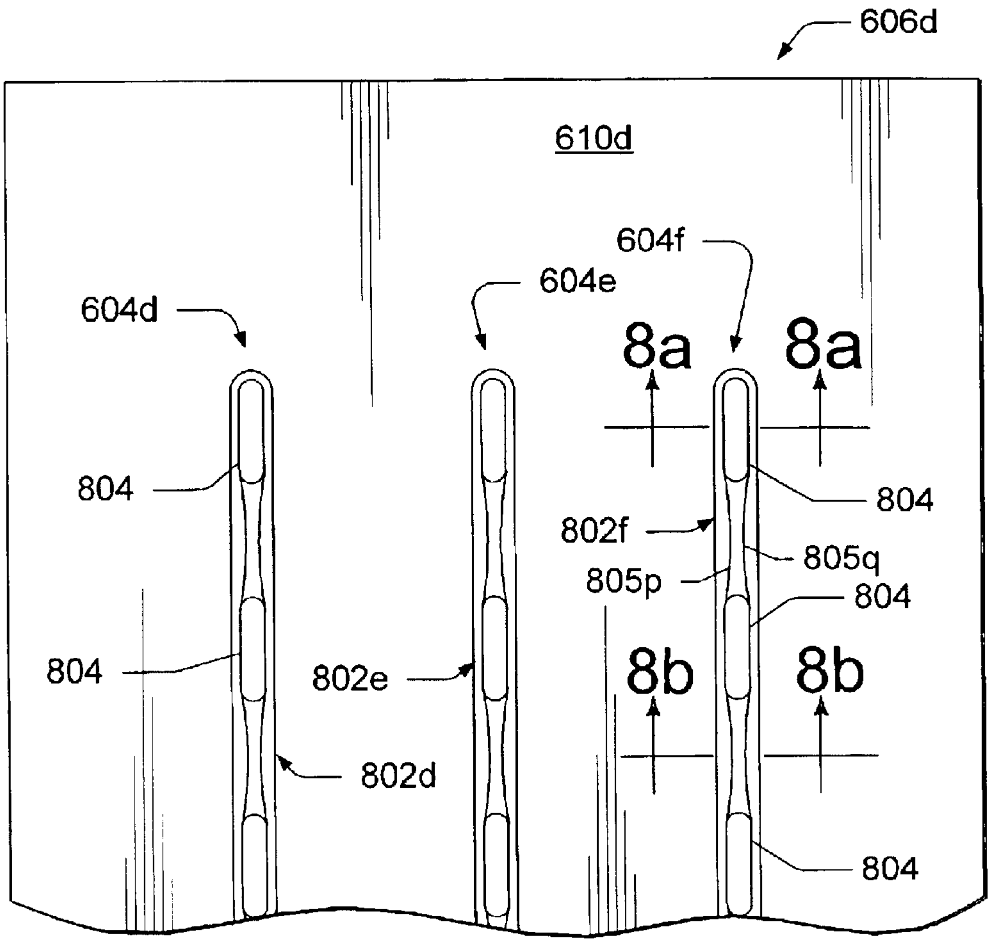
*Fig. 8*
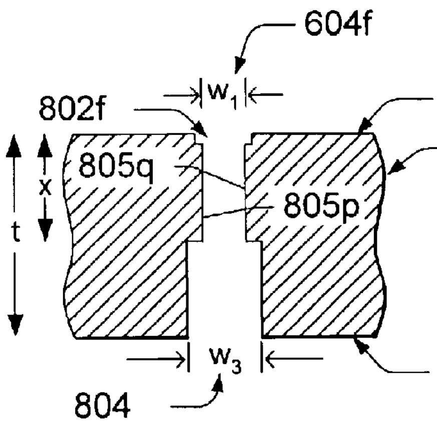
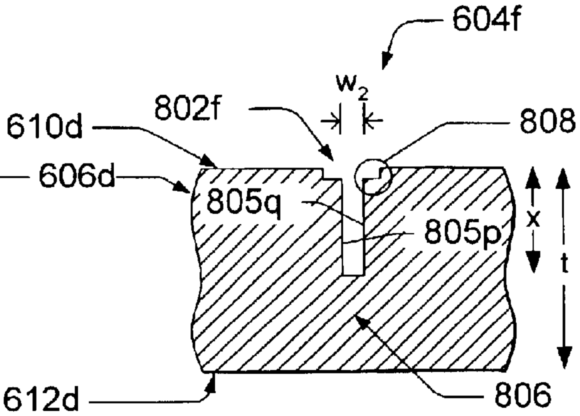
*Fig. 8a*
*Fig. 8b*

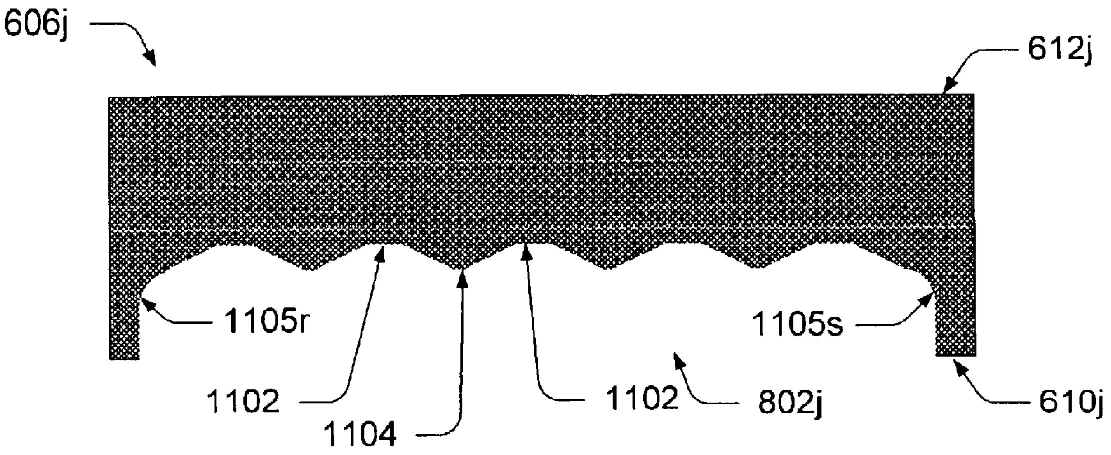
Fig. 11
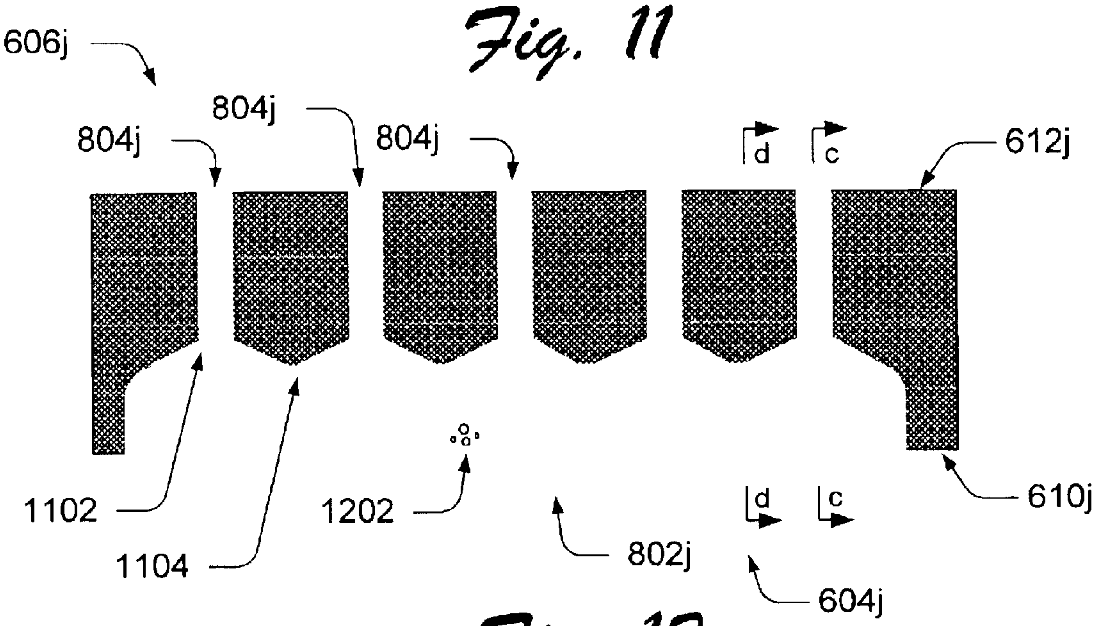
Fig. 12
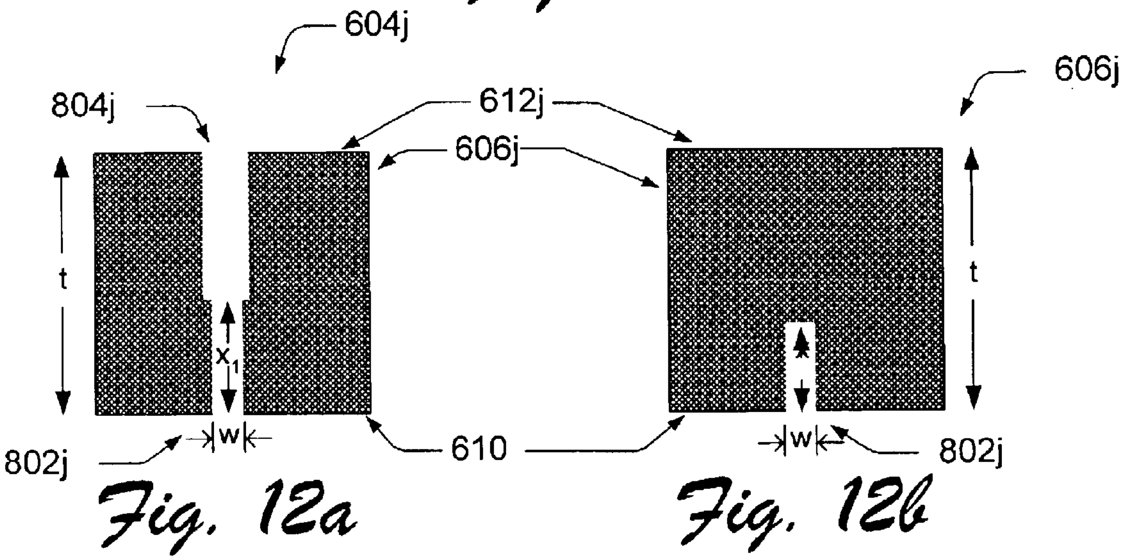
Fig. 12a
Fig. 12b

SLOTTED SUBSTRATES AND METHODS AND SYSTEMS FOR FORMING SAME

RELATED CASES

This patent application is a divisional claiming priority from a patent application having Ser. No. 10/205,959 titled "Slotted Substrates and Methods and Systems for Forming Same" filed Jul. 26, 2002, and issued as U.S. Pat. No. 6,540,337.

BACKGROUND

Inkjet printers and other printing devices have become ubiquitous in society. These printing devices can utilize a slotted substrate to deliver ink in the printing process. Such printing devices can provide many desirable characteristics at an affordable price. However, the desire for ever more features at ever-lower prices continues to press manufacturers to improve efficiencies. Consumers want ever higher print image resolution, realistic colors, and increased pages or printing per minute.

One way of achieving consumer demands is by improving the slotted substrates that are incorporated into fluid ejecting devices, printers and other printing devices. Currently, the various slotted substrates can be time consuming and costly to make.

Accordingly, the present invention arose out of a desire to provide fast and economical methods for slotted substrates having desirable characteristics.

BRIEF DESCRIPTION OF THE DRAWINGS

The same components are used throughout the drawings to reference like features and components.

FIG. 8 shows a top view of a substrate in accordance with one exemplary embodiment.

FIGS. 8*a*–8*b* each show a cross-sectional view of a substrate in accordance with one exemplary embodiment.

FIGS. 11–15 each show a cross-sectional view of a substrate in accordance with one exemplary embodiment.

DETAILED DESCRIPTION

Overview

The embodiments described below pertain to methods and systems for forming slots in a substrate. Several embodiments of this process will be described in the context of forming fluid feed slots in a substrate that can be incorporated into a print head die or other fluid ejecting device.

As commonly used in print head dies, the substrate can comprise a semiconductor substrate that can have microelectronics incorporated within, deposited over, and/or supported by the substrate on a thin-film surface that can be opposite a back surface or backside. The fluid feed slot(s) can allow fluid, commonly ink, to be supplied from an ink supply or reservoir to fluid ejecting elements contained in ejection chambers within the print head.

In some embodiments, this can be accomplished by connecting the fluid feed slot to one or more ink feed passageways, each of which can supply an individual ejection chamber. The fluid ejecting elements commonly comprise heating elements or firing resistors that heat fluid causing increased pressure in the ejection chamber. A portion of that fluid can be ejected through a firing nozzle with the ejected fluid being replaced by fluid from the fluid feed slot. Bubbles can be formed in the ink as a byproduct of the ejection process. If the bubbles accumulate in the fluid feed slot they can occlude ink flow to some or all of the ejection chambers and cause the print head to malfunction.

The fluid feed slots can comprise compound slots where the compound slot comprises a trench and multiple slots or holes. The trench can be formed in the substrate and connected to the multiple holes or slots formed into the substrate. The holes of the compound slot can receive ink from an ink supply and provide ink to the trench that can supply the various ink ejection chambers. The compound slots can be configured to reduce bubble accumulation and/or promote bubbles to migrate out of the compound slot.

The compound slots can be narrow and possess a high aspect ratio that can allow compound slots to be positioned closer together on the substrate thus reducing material costs and product size.

The compound slot can allow the substrate to remain much stronger than a similarly sized traditional slot since substrate material extends between the various holes and increases substrate strength. This configuration can be scalable to form a compound slot of any practical length. Further, the compound slot can be much faster to form since less material is removed in the formation process.

Exemplary Printer System

Figure 1:
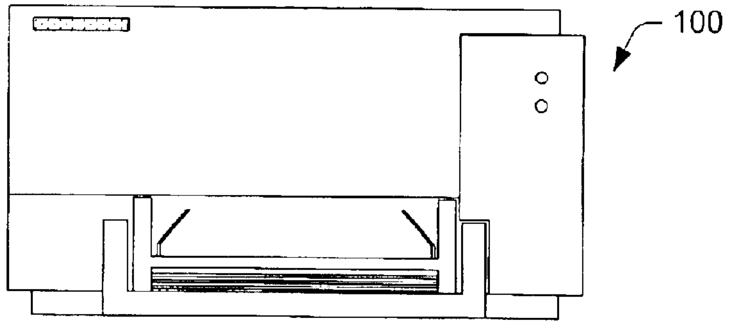
FIG. 1 shows a front elevational view of an exemplary printer.

FIG. 1 shows one embodiment of a printer 100 that can utilize an exemplary slotted substrate. The printer shown here is embodied in the form of an inkjet printer. The printer 100 can be, but need not be, representative of an inkjet printer series manufactured by the Hewlett-Packard Company under the trademark "DeskJet". The printer 100 can be capable of printing in black-and-white and/or in black-and-white as well as color. The term "printer" refers to any type of printer or printing device that ejects fluid such as ink or other pigmented materials onto a print media. Though an inkjet printer is shown for exemplary purposes, it is noted that aspects of the described embodiments can be implemented in other forms of image forming devices that employ slotted semiconductor substrates, such as facsimile machines, photocopiers, and other fluid ejecting devices.

Figure 2:
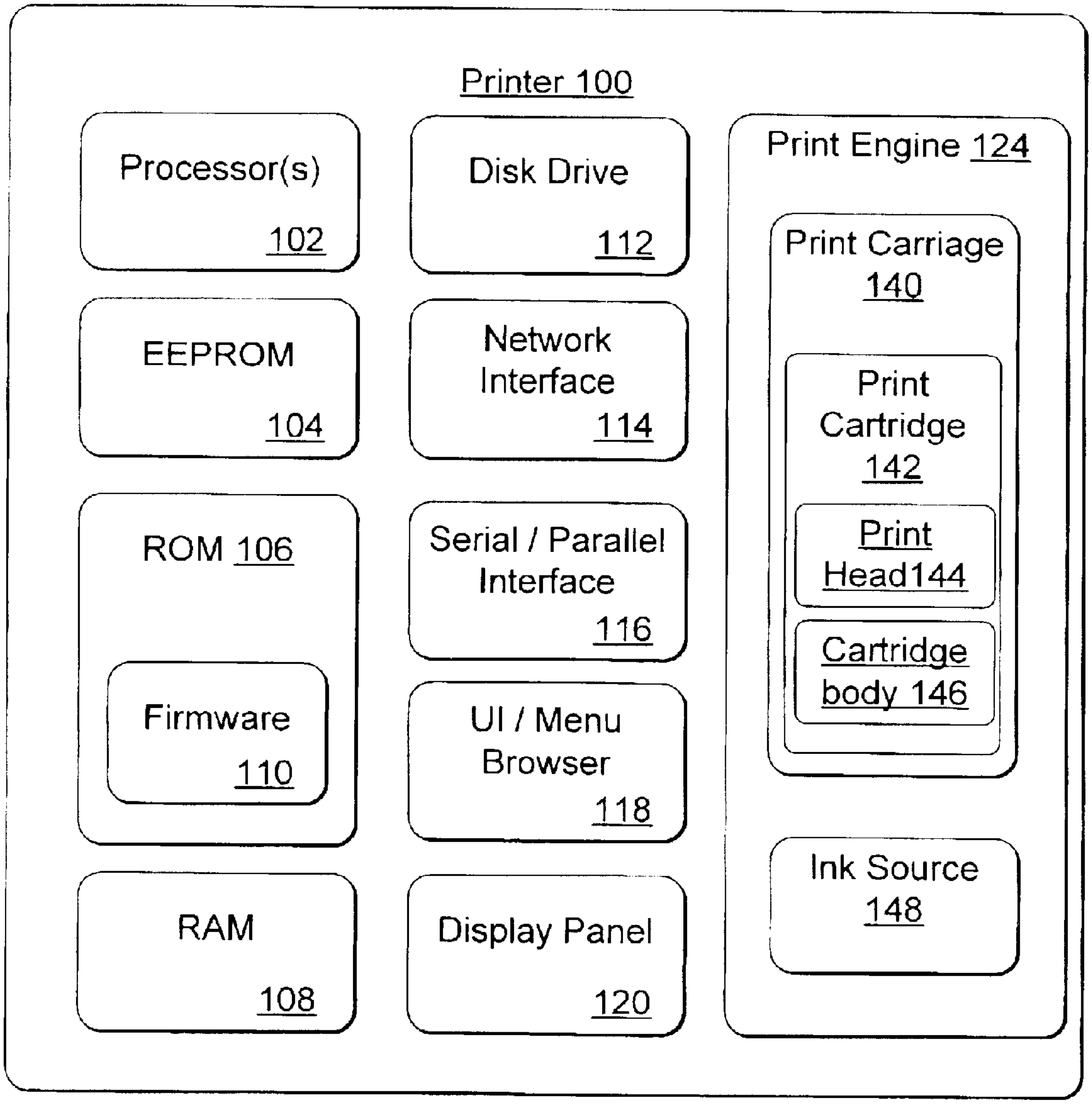
FIG. 2 shows a block diagram that illustrates various components of an exemplary printer.

FIG. 2 illustrates various components in one embodiment of printer 100 that can be utilized to implement the inventive techniques described herein. Printer 100 can include one or more processor(s) 102. The processor 102 can control various printer operations, such as media handling and carriage movement for linear positioning of the print head over a print media (e.g., paper, transparency, etc.).

Printer 100 can have an electrically erasable programmable read-only memory (EEPROM) 104, ROM 106 (non-erasable), and/or a random access memory (RAM) 108. Although printer 100 is illustrated having an EEPROM 104 and ROM 106, a particular printer may only include one of the memory components. Additionally, although not shown, a system bus typically connects the various components within the printing device 100.

The printer 100 can also have a firmware component 110 that is implemented as a permanent memory module stored on ROM 106, in one embodiment. The firmware 110 is programmed and tested like software, and is distributed with the printer 100. The firmware 110 can be implemented to coordinate operations of the hardware within printer 100 and contains programming constructs used to perform such operations.

In this embodiment, processor(s) 102 processes various instructions to control the operation of the printer 100 and to communicate with other electronic and computing devices. The memory components, EEPROM 104, ROM 106, and RAM 108, store various information and/or data such as configuration information, fonts, templates, data being printed, and menu structure information. Although not shown in this embodiment, a particular printer can also include a flash memory device in place of or in addition to EEPROM 104 and ROM 106.

Printer 100 can also include a disk drive 112, a network interface 114, and a serial/parallel interface 116 as shown in the embodiment of FIG. 2. Disk drive 112 provides additional storage for data being printed or other information maintained by the printer 100. Although printer 100 is illustrated having both RAM 108 and a disk drive 112, a particular printer may include either RAM 108 or disk drive 112, depending on the storage needs of the printer. For example, an inexpensive printer may include a small amount of RAM 108 and no disk drive 112, thereby reducing the manufacturing cost of the printer.

Network interface 114 provides a connection between printer 100 and a data communication network in the embodiment shown. The network interface 114 allows devices coupled to a common data communication network to send print jobs, menu data, and other information to printer 100 via the network. Similarly, serial/parallel interface 116 provides a data communication path directly between printer 100 and another electronic or computing device. Although printer 100 is illustrated having a network interface 114 and serial/parallel interface 116, a particular printer may only include one interface component.

Printer 100 can also include a user interface and menu browser 118, and a display panel 120 as shown in the embodiment of FIG. 2. The user interface and menu browser 118 allows a user of the printer 100 to navigate the printer's menu structure. User interface 118 can be indicators or a series of buttons, switches, or other selectable controls that are manipulated by a user of the printer. Display panel 120 is a graphical display that provides information regarding the status of the printer 100 and the current options available to a user through the menu structure.

This embodiment of printer 100 also includes a print engine 124 that includes mechanisms arranged to selectively apply fluid (e.g., liquid ink) to a print media such as paper, plastic, fabric, and the like in accordance with print data corresponding to a print job.

The print engine 124 can comprise a print carriage 140. The print carriage can contain one or more print cartridges 142 that comprise a print head 144 and a print cartridge body 146. Additionally, the print engine can comprise one or more fluid sources 148 for providing fluid to the print cartridges and ultimately to a print media via the print heads.

Exemplary Embodiments

Figure 4:
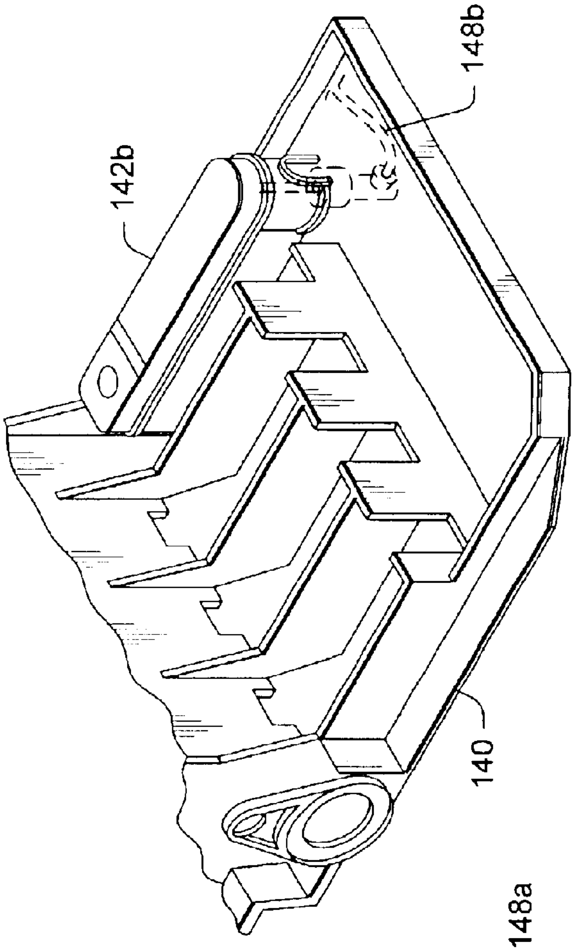
FIGS. 3 and 4 each show a perspective view of a print carriage in accordance with one exemplary embodiment.
Figure 3:
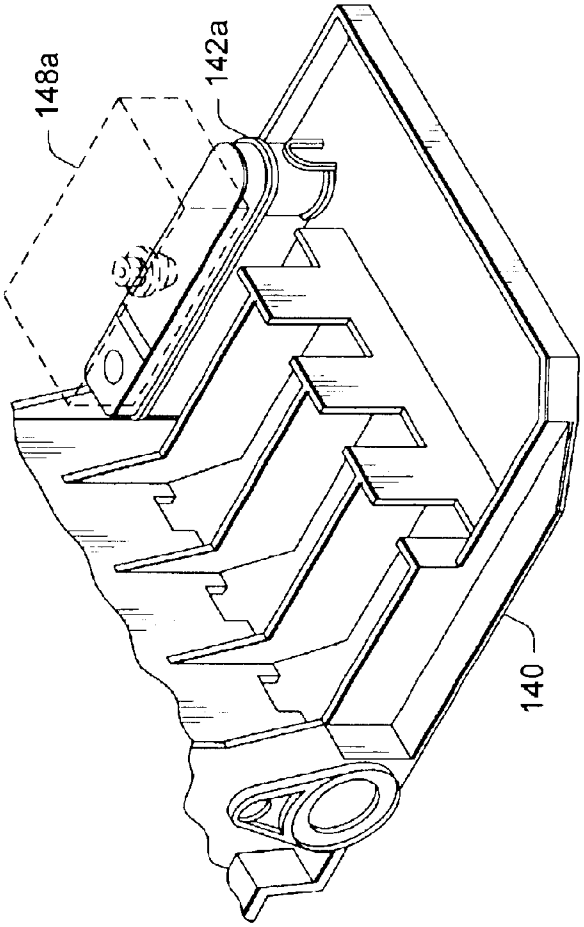

FIGS. 3 and 4 show exemplary print cartridges (**142*a* and 142*b*) in a print carriage 140 as can be utilized in some embodiments of printer 100. The print carriages depicted are configured to hold four print cartridges although only one print cartridge is shown. Many other exemplary configurations are possible. FIG. 3 shows the print cartridge 142*a* configured for an up connect to a fluid source 148*a*, while FIG. 4 shows print cartridge 142*b* configured to down connect to a fluid source 148*b***. Other exemplary configurations are possible including but not limited the print cartridge having its own self-contained fluid supply.

Figure 5:
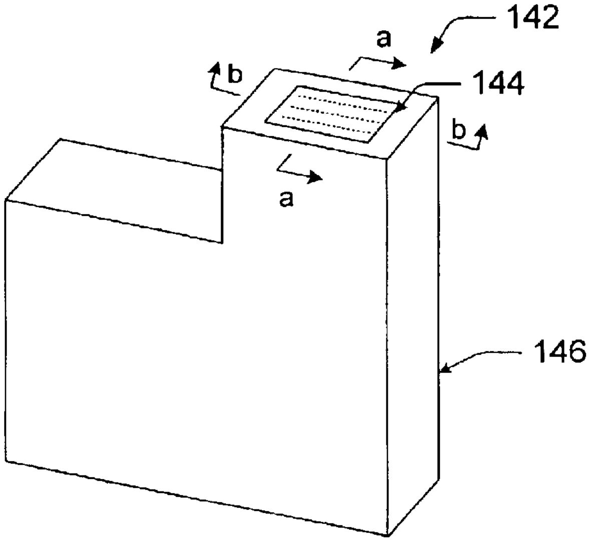
FIG. 5 shows a perspective view of a print cartridge in accordance with one exemplary embodiment.

FIG. 5 shows an exemplary print cartridge 142. The print cartridge is comprised of the print head 144 and the cartridge body 146. Other exemplary configurations will be recognized by those of skill in the art.

Figure 6:
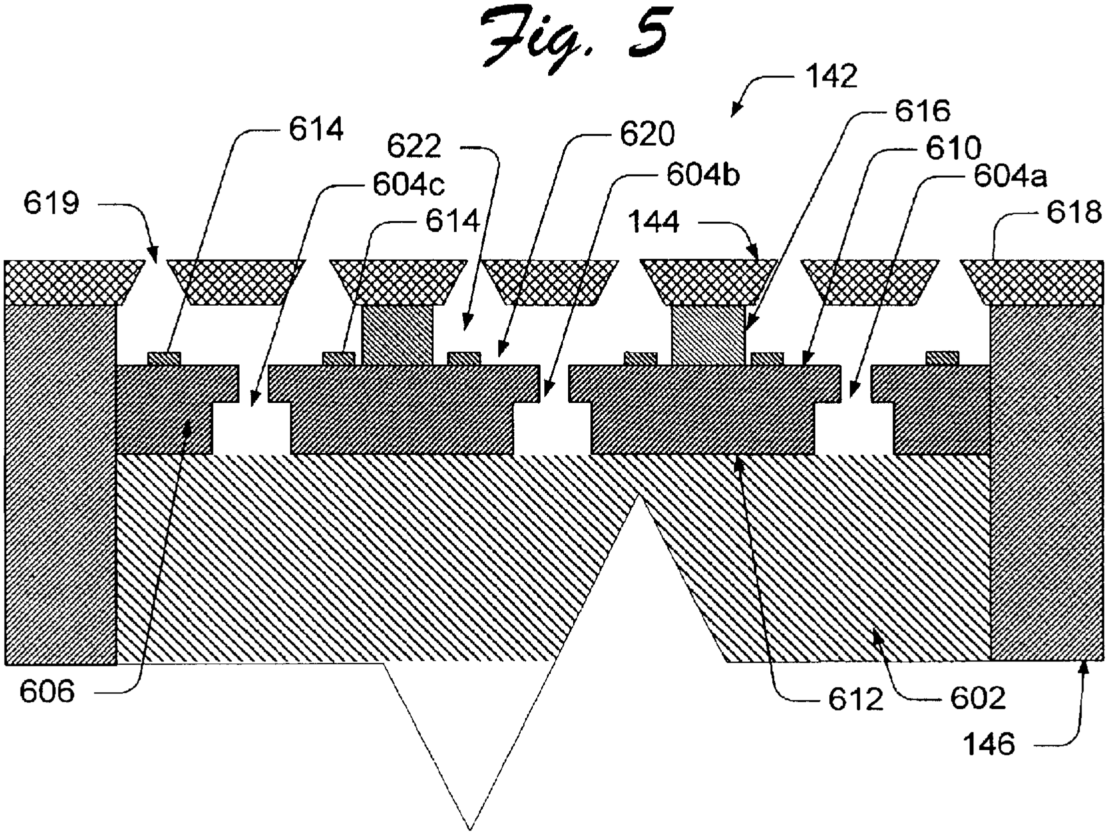
FIG. 6 shows a cross-sectional view of a top portion of a print cartridge in accordance with one exemplary embodiment.

FIG. 6 shows a cross-sectional representation of a portion of the exemplary print cartridge 142 taken along line a—a in FIG. 5. It shows the cartridge body 146 containing fluid 602 for supply to the print head 144. In this embodiment, the print cartridge is configured to supply one color of fluid or ink to the print head. In other embodiments, as described above, other exemplary print cartridges can supply multiple colors and/or black ink to a single print head. Other printers can utilize multiple print cartridges each of which can supply a single color or black ink. In this embodiment, a number of different fluid feed slots are provided, with three exemplary slots being shown at **604*a*, 604*b*, and 604*c*. Other exemplary embodiments can divide the fluid supply so that each of the three fluid feed slots 604*a*–604*c*** receives a separate fluid supply. Other exemplary print heads can utilize less or more slots than the three shown here.

The various fluid feed slots **604*a*–604*c* pass through portions of a substrate 606. In this exemplary embodiment, silicon can be a suitable substrate. In some embodiments, substrate 606** comprises a crystalline substrate such as monocrystalline silicon or polycrystalline silicon. Examples of other suitable substrates include, among others, gallium arsenide, glass, silica, ceramics, or a semi-conducting material. The substrate can comprise various configurations as will be recognized by one of skill in the art.

The substrate 606 has a first surface 610 and a second surface 612. Positioned above the substrate are the independently controllable fluid drop generators that in this embodiment comprise firing resistors 614. In this exemplary embodiment, the resistors 614 are part of a stack of thin film layers on top of the substrate 606. The thin film layers can further comprise a barrier layer 616.

The barrier layer 616 can comprise, among other things, a photo-resist polymer substrate. Above the barrier layer is an orifice plate 618 that can comprise, but is not limited to a nickel substrate. The orifice plate has a plurality of nozzles 619 through which fluid heated by the various resistors 614 can be ejected for printing on a print media (not shown). The various layers can be formed, deposited, or attached upon the preceding layers. The configuration given here is but one possible configuration. For example, in an alternative embodiment, the orifice plate and barrier layer are integral.

The exemplary print cartridge shown in FIGS. 5 and 6 is upside down from the common orientation during usage. When positioned for use, fluid can flow from the cartridge body 146 into one or more of the slots 604*a*–604*c*. From the slots, the fluid can travel through a fluid feed passageway 620 that leads to an ejection chamber 622. An ejection chamber can be comprised of a resistor 614, a nozzle 619, and a given volume of space therein. Other configurations are also possible. When an electrical current is passed through the resistor in a given ejection chamber, the fluid can be heated to its boiling point so that it expands to eject a portion of the fluid from the nozzle 619. The ejected fluid can then be replaced by additional fluid from the fluid feed passageway 620. Various embodiments can also utilize other ejection mechanisms.

Figure 7:
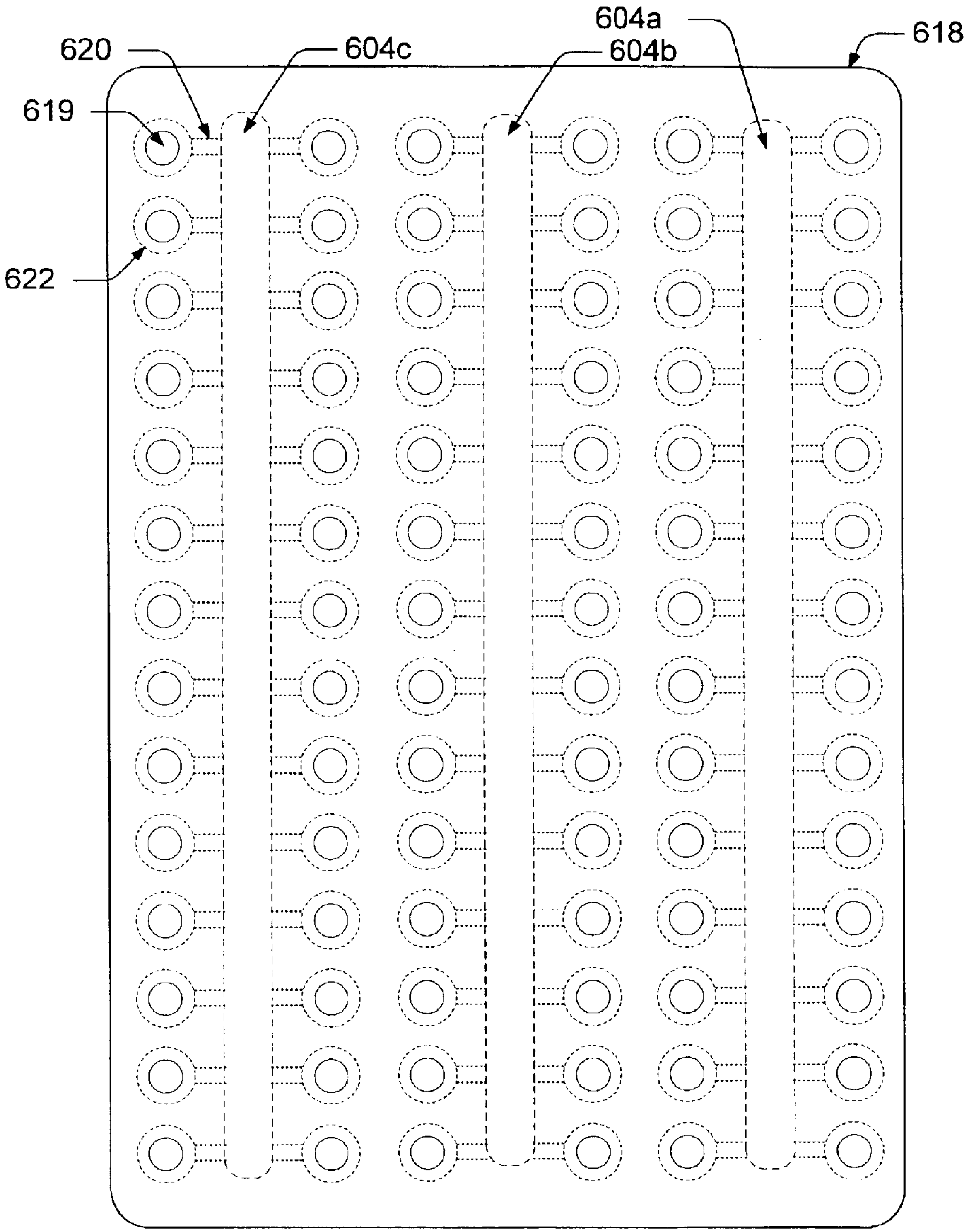
FIG. 7 shows a top view of a print head in accordance with one exemplary embodiment.

The embodiment of FIG. 7 shows a view from above an orifice plate 618 comprising a portion of a print head (not shown). The orifice plate 618 comprising numerous nozzles 619 is positioned over several underlying structures of the print head indicated in dashed lines. The underlying structures include ejection chambers 622 that are connected to fluid feed passageways (feed channel) 620 and then to a slot 604*a–c*. Although the ejection chambers shown here are arranged generally linearly along a slot, other exemplary embodiments use other configurations. For example, a staggered configuration of the ejection chambers can be utilized in some embodiments to increase the number of ejection chambers associated with a given slot length.

FIGS. 8–8*b* show slots (604*d*, 604*e*, and 604*f*) formed in a substrate 606*d*. FIG. 8 shows a view from above the substrate, while FIGS. 8*a* and 8*b* show cross sections taken through the substrate. The illustrated substrate 606*d* has a thickness t (shown FIG. 8*a*). The described embodiments can work satisfactorily with various thicknesses of substrate. For example, in the specific described embodiments, the thickness t can range from less than about 100 microns to at least about 2000 microns. Other exemplary embodiments can be outside of this range. The thickness t of the substrate in some exemplary embodiments can be about 675 microns.

FIG. 8 shows a view from above a first surface 610*d* of the substrate 606*d*. The view shown here is similar to that shown in FIG. 7, except that the layers above the substrate including the orifice plate are not shown. As with FIG. 7, in FIG. 8 the substrate's first surface 610*d* comprises a thin film surface or side. The slots (604*d*, 604*e*, and 604*f*) can be termed compound slots since, in this embodiment, the slots are comprised, at least in part, by respective trenches (802*d*, 802*e*, and 802*f*) formed in the substrate and connected to multiple slots 804. Each slot 804 can pass through the substrate from the substrate's backside 612*d* and connect with one of the trenches (802*d*, 802*e*, and 802*f*).

This can be more readily seen in FIGS. 8*a* and 8*b* that show cross-sections of a portion of the embodiment shown in FIG. 8. Each of these Figures show a cross-section taken transverse and along a long axis of the compound slot 604*f*. FIG. 8*a* shows a portion of the slot 604*f* where the trench 802*f* is proximate to a slot 804.

FIG. 8*b* shows a second cross-sectional view of the compound slot 604*f*. In this view, the trench 802*f* is visible, but no slot passes through this cross-section. Instead, substrate material (shown generally at 806) that remains after the formation of the compound slot can allow the substrate to remain much stronger than would otherwise be possible. This substrate material 806 can act as a reinforcing structure that can, among other things, serve to connect or strengthen the substrate material on opposite sides of a slot. Such reinforcement can strengthen the slotted substrate as well as decreasing substrate deformation.

Many existing technologies form a fluid feed slot that has a generally constant width and length that is formed all the way through the thickness of the substrate. Removing all of the substrate material greatly weakens the slotted substrate, especially if long slots are formed.

When multiple slots are formed in a single substrate using these existing technologies, the substrate material remaining between the slots can often distort or bend from the generally planar configuration that the substrate can have prior to slot formation. Such distortion can be the result of torsional forces, among others, experienced by the substrate when integrated into a print head. For example, torsional forces can be measured by a resistance of the slotted substrate to deviance from an ideal configuration relative to an axis that is parallel to a long axis of the substrate. The long axis of the substrate being generally parallel to the long axis of the slots. The distortion or deformation can make the substrate weaker and more prone to breakage during processing.

Distortion and/or deformation can also make integrating the substrate into a die or other fluid ejecting device more difficult. Often the substrate is bonded to other different substrates to form a print head and ultimately a print cartridge. These different substrates can be stiffer than a slotted substrate produced by existing technologies and can cause the slotted substrate to deform to their configuration.

The distortion of the print head can change the geometries at which fluid is ejected from the ejection chambers located on the distorted portions of the slotted substrate. The exemplary slotted substrates are more resistant to such deformation, and can better maintain the planar configuration that is desired in many print heads. The described embodiments can be especially resistant to deformation or bending along an axis orthogonal to the first surface of the substrate. This resistance to deformation can provide a desirable integrated print head.

Beyond the distortion that removing so much substrate material can cause, the act of removing the substrate material is costly and time consuming. It will be further recognized that these distortions can be amplified if longer slots are formed. Conversely, the described embodiments are scalable to any desired length since the substrate material that remains between the multiple slots reinforces the slotted substrate and less material can be removed per given length of substrate.

Additionally, many of these current technologies form a slot that is wider than desirable in order to adequately provide ink to the ejection chambers to which the slot supplies ink. The described embodiments can have a compound slot that is narrower and/or has a higher aspect ratio than existing technologies. Such slots can remove less substrate material which can require less machining and can provide a stronger slotted substrate.

Other attempts have been made to reduce the amount of substrate material removed during slot formation, but in some of these technologies, bubble accumulation in the slots has hindered performance. Some of these existing technologies can create areas within a slot where bubbles tend to accumulate. This can cause malfunctions of the print head and has prevented adoption of these technologies. The present embodiments can reduce bubble accumulation while providing the machining and strength advantages of a non-continuous compound slot.

Referring again to FIGS. 8*a* and 8*b*, it can be seen that in this embodiment, the width $w_1$ of the trench 802*f* at a region that is proximate to a slot 804 is greater than the width $w_2$ where the trench is more distant to a slot. In this embodiment, the trench achieves such a configuration by having a pair of sidewalls (805*p* and 805*q*). As shown here, an individual sidewall can have at least a portion of its profile not parallel to a plane that contains the long axis and is orthogonal to the first surface. FIG. 8 shows a view from above the first surface 610*d* and the sidewalls 805*p* and 805*q* appear generally sinusoidal. Other exemplary configurations will be recognized by the skilled artisan.

Some sidewall configurations such as the generally sinusoidal configuration shown here can allow regions of the trench 802*f* that are the most distant to a slot 804 to have the trench's minimum width $w_2$ and those regions which are proximate a slot can have the trench's maximum width $w_1$. This can promote the movement or migration of any bubbles toward the wider regions that are proximate to a slot 804. Additionally, in this embodiment, the width $w_3$ of the slot 804 can be greater than the maximum width of the trench 802*f*. This can further promote bubble migration from the trench into the slot.

Bubble migration can be affected, at least in part, by an energy state of a bubble in an ink feed slot. A bubble can have a generally increasing mass by coalescing with other bubbles present in the ink, and/or vapor coming out of solution. If the bubble is constrained by its physical surroundings in the ink feed slot, an energy state of the bubble can rise. According to this model, the energy state comprises external forces on the bubble combined with surface tension experienced by the bubble. These factors are in equilibrium with a bubble vapor pressure.

An increased energy state can create a propensity for a bubble to move to a physical location where it can reduce its energy state. The propensity of bubbles to move toward the lower energy state can be increased by reducing and/or eliminating any intermediate regions that require the bubble to pass through a higher energy state to reach a location that allows the bubble to achieve the lower energy state. The exemplary embodiments can promote bubble migration by, at least in part, providing a compound slot environment where bubbles experience generally decreasing energy states as they travel from the thin film to the backside.

Bubble migration and/or the energy state of the bubble can also be affected by buoyancy forces. Buoyancy forces on a bubble approximate the weight of the liquid it displaces. Buoyancy forces promote the movement of a bubble upward in the fluid. In some of the described embodiments, the slotted substrate can be oriented in a printing device so that the backside surface is positioned above the thin film surface. Ink can then flow generally from the print cartridge body through the backside toward the thin film surface where it can ultimately be ejected from the nozzles. Bubbles can travel in a direction generally opposite to the ink flow. The described embodiments can increase the propensity of bubbles to migrate as desired.

In the embodiment depicted in FIGS. 8*a* and 8*b*, the width of the trench can vary while the depth x of the trench remains generally constant. This can cause the trench to have a variable cross-sectional area. As shown in this embodiment, the cross-sectional area of the trench 802*f* is greater in proximity to a slot 804 as shown in FIG. 8*a*, and less when more distant to a slot as shown in FIG. 8*b*.

In the described embodiments, the trench can have various dimensions. In some exemplary embodiments, the length can range from about 100 microns to at least about 25,400 microns. In one exemplary embodiment, the length can be about 8500 microns. The trench can have widths of 30 microns to about 300 microns with some embodiments utilizing 200 microns. The trench can have a depth ranging from about 50 microns to about 500 microns. The trench depth can also be measured relative to the thickness t of the substrate 606. In some embodiments, individual trenches can have depths ranging from about 10 percent to about 80 percent of the substrate's thickness.

Trench 802*f*, as shown in FIGS. 8*a* and 8*b*, can also include a shallow shelf portion 808. This portion of the trench can allow the various ink feed passageways 620 (shown FIG. 6) to be a known and/or uniform length. In other exemplary embodiments, the trench may or may not contain a shallow shelf portion. In some exemplary embodiments which comprise a shallow shelf, the width of the shallow shelf can be from 5 percent to 150 percent of the minimum width of the trench. In other embodiments the shallow shelf's width can be less than or equal to the minimum width of the trench. In some exemplary embodiments, the width of the shallow shelf can be about 80 percent of the minimum width of the trench.

The various slots 804 can have a wide range of dimensions and shapes. Some exemplary embodiments can utilize cylindrical slots having a diameter ranging from about 30 microns to about 300 microns. In one embodiment, the diameter can be about 200 microns. Other embodiments can utilize slots that appear elliptical, or rectangular in cross section. In one exemplary embodiment, individual slots 804 can have a cross-sectional area of about $1.5 \times 10^5$ (150,000) square microns. Other embodiments can utilize slots having cross sectional areas ranging from about 5000 square microns to about $3.8 \times 10^6$ square microns.

The described embodiments can provide satisfactory ink flow to supply adequate ink to all portions of the trench during printing. In one exemplary embodiment, an exemplary trench, as described above, can be supplied by 10 slots. Individual slots can have an average cross sectional area of $2.0 \times 10^5$ square microns.

Figure 9:
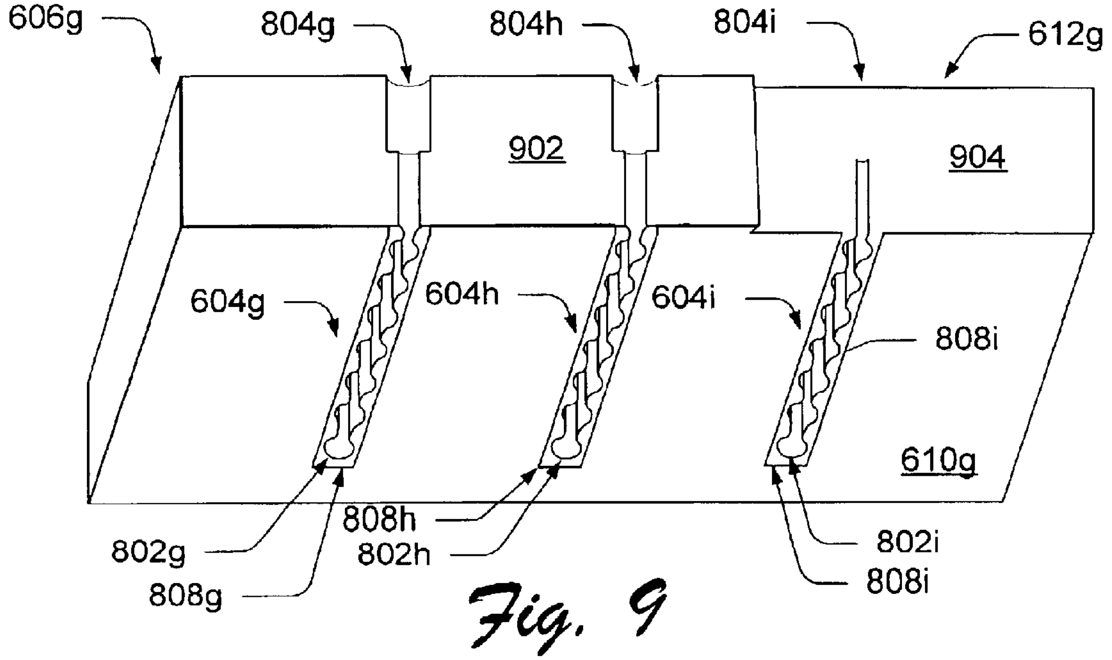
FIGS. 9–10 each show a perspective view of a substrate in accordance with one exemplary embodiment.
Figure 10:
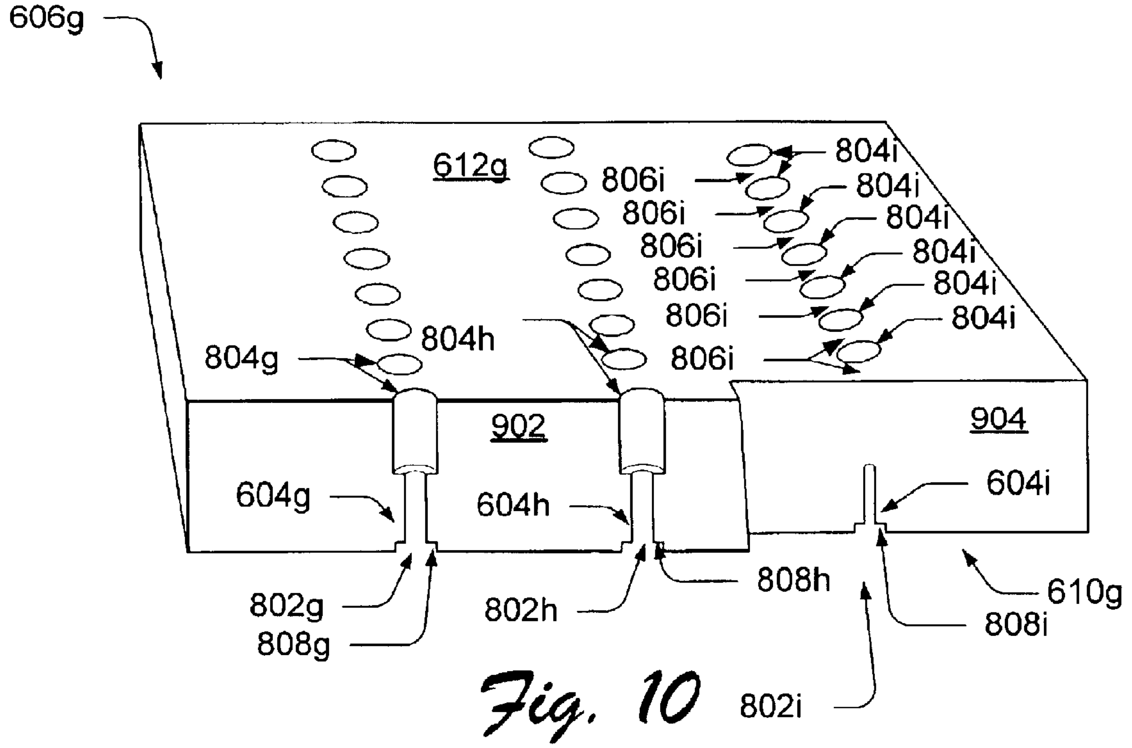

FIGS. 9 and 10 show a perspective view of a substrate 606*g* that has compound slots (604*g*, 604*h*, and 604*i*) formed in it. Each of the compound slots can be comprised of a trench (802*g*–*i*) and multiple slots (804*g*–*i*).

FIG. 9 is a perspective view from slightly below the substrate showing the first surface 610*g*, while FIG. 10 is a perspective view from slightly above, so the second surface 612*g* is visible. As shown in FIGS. 9 and 10, the substrate 606*g* is oriented similarly to the most common orientation during printing where the first surface can face, and is generally parallel to, the print media. In this orientation, ink can flow from a cartridge body 146 (shown FIG. 5) attached to the second surface 612*g*, through the compound slot(s) and ultimately be ejected from an orifice plate attached to the first surface 610*g*.

To aid the reader in understanding the present embodiments, a portion of the right side of the substrate 606*g* in each of the Figures has been cut away so that a different portion of compound slot 604*i* is visible when compared to compound slots 604*g* and 604*h*. The portion of the compound slots visible on cross-sectional surface 902 shows two trenches (802*g* and 802*h*) and two slots (804*g* and 804*h* respectively).

In this embodiment, the area of the trench shown on surface 902 can be the widest portion of the trench. This can be contrasted with the portion of the trench 802*i* shown on cross-sectional surface 904 where the trench is not proximate a slot (804*i* shown FIG. 10). The areas of substrate remaining between the slots can comprise reinforcement structures 806*i*.

The reinforcement structures 806*i* can increase the strength of the slotted substrate 606*g*. For example, FIG. 10 shows seven slots 804*i* comprising compound slot 604*i*. Positioned between the slots are reinforcing areas or structures 806*i* where the substrate material remains upon completion of the slot. These structures can decrease deformation of substrate material on opposing sides of a compound slot. Among other advantages, the resultant slotted substrate can be stronger in bending in or out of the plane of at least a portion of the first surface 610*g* of the substrate 606*g* than if the reinforcement structure 806*i* was not present.

As shown in this embodiment, each trench (802*g*–802*i*) has generally the same depth for the length of the trench. Thus regions proximate a slot 804*g*–*h*, as shown on surface 902 or more distant a slot 804*i*, as shown on surface 904, can have equal depths. The cross-section of the trench 802*i* shown on surface 904 is, however, both narrower and has a smaller area than cross-sections of trenches 802*g* and 802*h* shown on surface 902.

As shown in this embodiment, each of the trenches further has a shallow shelf region (808*g*–*i* respectively) as described above in relation to FIG. 8. The shallow shelf region can aid in providing a uniform and/or known length ink feed passageway (shown FIG. 6) from the slot to individual firing chambers (shown FIG. 6).

The embodiments shown in FIGS. 8–8*b*, 9 and 10 can reduce bubble accumulation, at least in part, by varying the width and/or cross section of a trench depending on the proximity to a slot 804. The embodiments depicted in FIGS. 11–15 can reduce the occurrence of bubble accumulation, at least in part, by varying the depth of a trench.

FIG. 11 shows a cross-sectional view taken along a long axis of a trench 802*j* formed or received in a first surface

610*j* of a substrate 606*j* in a first step. In this exemplary embodiment, the trench 802*j* has a generally uniform width w (shown in FIGS. 12*a* and *b*); however, as can be seen from the drawings the depth ($x_1$ and $x_2$) of the trench varies between alternating relatively deeper regions 1102 and relatively shallower regions 1104. The trench can be partially defined by a pair of generally opposing end walls (1105*r* and 1105*s*). In some embodiments, a profile of an individual end wall 1105*r* has a substantial portion that is not perpendicular to the long axis of the trench. As shown here the end walls are generally arcuate. This configuration can aid in bubble migration as will be discussed in more detail below.

FIG. 12 shows multiple slots 804*j* formed in the substrate connecting the trench 802*j* to a backside surface 612*j* in a second step. The trench 802*j* and slots 804*j* can form a compound slot 604*j*. In this cross-sectional view taken along a long axis of the trench 802*j*, the slots are generally connected to the trench proximate to the deeper trench regions 1102, where the shallow regions 1104 are between adjacent slots 804*j*. This can be seen more clearly in FIGS. 12*a* and 12*b* that show cross-sectional views taken transverse to the view shown in FIG. 12. FIGS. 12*a* and 12*b* show views similar to those shown in FIGS. 8*a* and 8*b*.

FIG. 12*a* shows a cross-sectional view taken along line c—c in FIG. 12. FIG. 12*b* shows a cross-sectional view taken along line d–d in FIG. 12. Each of these views is similar to the cross-sectional view of FIG. 6 that is taken along line a—a in FIG. 5. FIG. 12*a* shows a portion of the trench 802*j* shown in FIG. 12 that is proximate and connected to a slot 804*j*. FIG. 12*b* shows a portion of the trench 802*j* that is more distal to the various slots 804*j* than the view shown in FIG. 12*a*. In the embodiment depicted here, the trench 802*j* has a generally uniform width w for its length and so the width of the portion shown in FIG. 12*a* generally equals the width of the portion shown in FIG. 12*b*. However, in this embodiment, the depth of the trench varies as can be seen here where the depth $x_1$ as shown in FIG. 12*a* is greater than the depth $x_2$ as shown in FIG. 12*b*.

In these embodiments, the various cross-sections taken transverse to the long axis of the trench 802*j* and/or compound slot 604*j* can have varying cross-sectional areas and also can have varying cross-sectional shapes. For example, in the embodiment shown in FIGS. 12*a*–12*b*, each of the cross-sections of the trench can be generally represented as a rectangle. Individual rectangles can have the same width, but differing heights, and therefore having different shapes. Other exemplary embodiments can combine these various features in other configurations.

As shown in FIGS. 11 and 12, the trench 802*j* was formed prior to the slots 804*j*, however, other embodiments can be formed in various sequences. For example, slots can be formed part way through the thickness of the substrate and then a trench formed to join or connect to the slots.

Other embodiments can form slots through the entire thickness of the substrate and then form a trench relative to the slots to form a compound slot. Those of skill in the art will recognize other suitable configurations.

The exemplary embodiments described so far have comprised removal steps to remove substrate material to form the compound fluid feed slots. However, other exemplary embodiments can include various steps where material is added to the substrate during the slotting process. For example, in one embodiment, after the slots are formed, a deposition step can add a new layer of material through which the trench is formed to form the compound slot. Other embodiments can also include one or more steps to clean-up or further finish the compound slots. These additional steps can occur intermediate to, or subsequent to, the described steps.

FIGS. 12–15 show some examples of possible ways in which the described embodiments can reduce bubble accumulation in the compound slot 604*j*. FIG. 12 represents an orientation for a substrate 606*j* incorporated into a print cartridge (shown FIG. 6) or other fluid ejecting device. In this orientation, fluid can be received into the backside or top surface 612*j* from the cartridge body 146 and pass through the slots 804*j* to supply the trench 802*j*. The trench can supply the various ejection chambers (shown FIG. 6) that can be positioned on the first or thin-film surface 610*j*.

Figure 13:
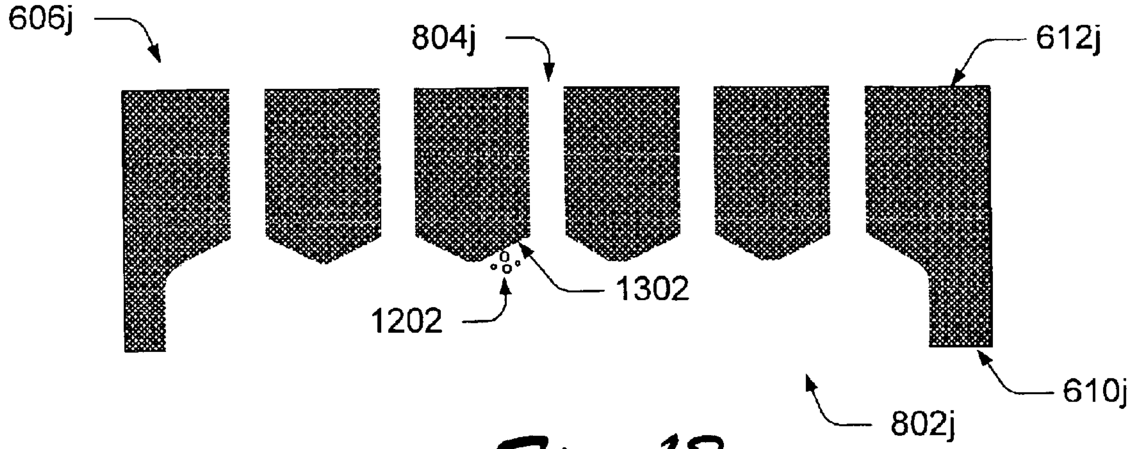

When fluid is ejected from the firing chambers bubbles can be created. Such bubbles can enter the compound slot 604*j*. For example, FIG. 12 shows a group of bubbles 1202 near the thin film surface 610*j* of the trench 802*j*. In FIG. 13, the bubbles 1202 have moved upward and contacted the substrate at the bottom (top surface 1302) of the trench. As can be seen, this top surface 1302 is generally sloped toward the connecting slots 804*j*.

Figure 14:
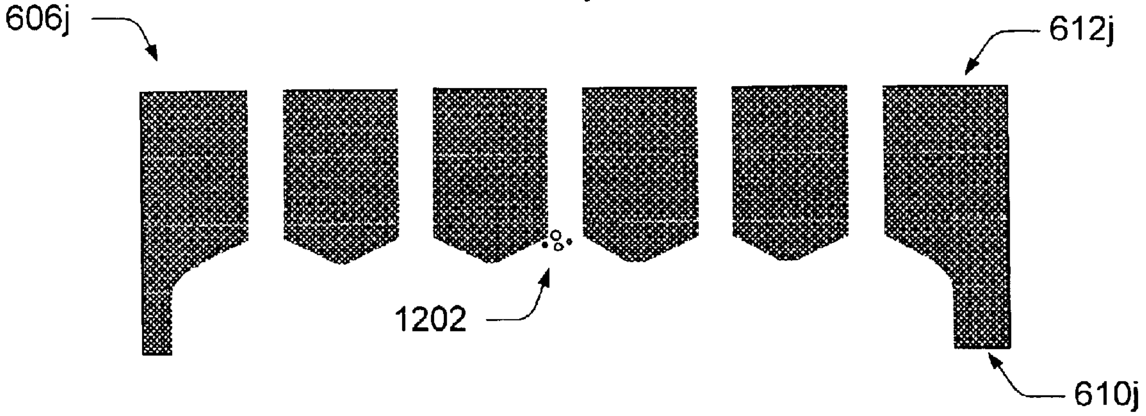
Figure 15:
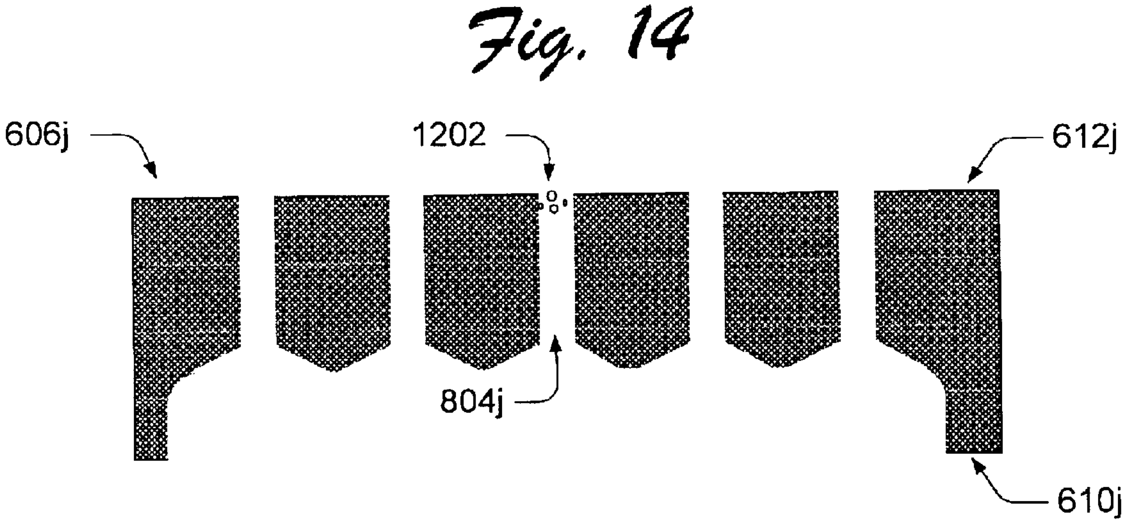

FIG. 14 shows the bubbles 1202 having moved at an upward angle following the configuration of the trench 802*j*. This movement has positioned the bubbles 1202 at a position below a slot 804*j*. FIG. 15 shows the bubbles having migrated up through the slot 804*j* and about to exit the substrate.

Though the embodiments shown in FIGS. 11–15 and the embodiments shown in FIGS. 8–8*b* utilize a single configuration to reduce bubble accumulation in the trench, other exemplary embodiments can combine various configurations. For example, the varying width of the trench shown in FIGS. 8–8*b* can be combined with the varying depth of the trench shown in FIGS. 11–15 to create multiple configurations to reduce bubble accumulation.

Exemplary Methods

Figure 16:
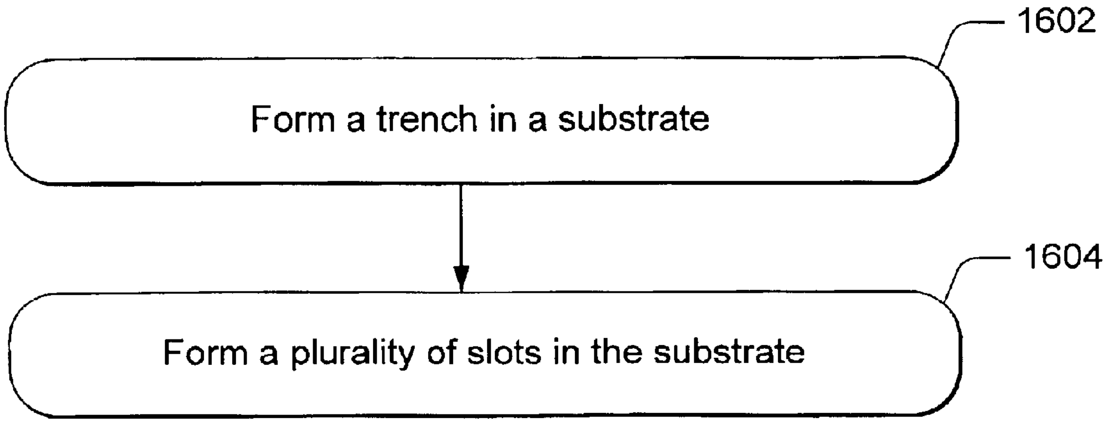
FIG. 16 shows a flow chart representing steps in a method in accordance with one exemplary embodiment.

FIG. 16 is a flow diagram describing a method for forming exemplary slotted substrates. Step 1602 forms a trench in a substrate. Various techniques can be used to form the trench. In some exemplary embodiments, laser machining is used to form the trench. In one exemplary embodiment, laser machining can be used to from the trench on a first surface where the first surface comprises thin-film side of the substrate. In this particular embodiment, a barrier layer can be deposited prior to the formation of the trench. This can allow a more uniform barrier layer thickness to be maintained on the slotted substrate.

Various suitable laser machines will be recognized by one of skill in the art. One suitable laser machine that is commercially available can comprise the Xise 200 laser Machining Tool, manufactured by Xsil ltd. of Dublin, Ireland.

Step 1604 forms a plurality of slots in the substrate. The slots can connect to at least portions of the trench to form a compound slot through the substrate. The trench can be configured to promote the migration of bubbles from the trench into the slots. The slots can be formed with various methods. For example, sand drilling can be used to form the slots. Sand drilling is a mechanical cutting process where target material is removed by particles, such as aluminum oxide, delivered from a high-pressure airflow system. Sand drilling is also referred to as sand blasting, abrasive sand machining, and sand abrasion.

As an alternative to sand drilling, other exemplary embodiments can use one or more of the following techniques to form the slots: laser machining, etching processes such as dry etching and/or wet etching, mechanical machining, and others. Mechanical machining can include the use of various saws and drills that are commonly used to remove substrate material. Multiple or hybrid processes can be used to form a slot or trench comprising the compound trench. Alternatively or additionally, different processes can be used to form the trench than those used to form the slots.

Conclusion

The described embodiments can provide methods and systems for forming a fluid feed slot in a substrate. The slots can supply ink to the various fluid ejecting elements connected to the fluid feed slot while allowing the slotted substrate to be stronger than existing technologies. The described fluid feed slots can have a compound configuration comprised of a trench received in the substrate's first surface and connected to a plurality of slots passing through the substrate from its second surface. The described embodiments leave substrate material between the various slots comprising the plurality of slots and therefore enhance the structural integrity of the slotted substrate. This can be especially valuable for longer slots that can otherwise tend to cause the substrate to be brittle and have a propensity to deform. The described embodiments are scalable to allow a compound ink feed slot of almost any desired length to be formed. The described embodiments can also be quicker to form since less material per a given slot length is removed. The slots can be inexpensive and quick to form and have aspect ratios higher than existing technologies. They can be made as long as desirable and have beneficial strength characteristics that can reduce die fragility and allow slots to be positioned closer together on the die.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A method of forming fluid feed slots in a substrate comprising:

forming a trench in a substrate; and, forming a plurality of slots in the substrate that connect to at least portions of the trench to form a compound fluid feed slot through the substrate, wherein the trench is configured to promote bubbles to migrate from the trench into the slots.

2. The method of claim 1, wherein said forming a trench comprises laser machining a trench.

3. The method of claim 1, wherein said forming a plurality of slots comprises one or more of: laser machining, dry etching, wet etching, sand drilling, and mechanical drilling.

4. The method of claim 1, wherein said forming a trench comprises forming a trench having a varying width wherein the regions of the trench having greater widths are proximate to one of the plurality of slots.

5. The method of claim 1, wherein said act of forming a trench and said act of forming a plurality of slots are both completed from a first side of the substrate.

6. The method of claim 1, wherein said act of forming a trench is completed from a first side of the substrate and said act of forming a plurality of slots is completed from a second opposite side of the substrate.

7. The method of claim 1, wherein said act of forming a plurality of slots is completed prior to said act of forming a trench.

8. The method of claim 1, wherein said forming a trench and said forming a plurality of slots form a compound fluid feed slot that is configured to promote the migration of bubbles in a direction that decreases an energy state of the bubbles.

9. A method comprising:

removing substrate material to form a compound slot through a substrate; and, wherein said compound slot comprises a trench connected to multiple slots and wherein the trench has varying cross-sectional areas when viewed transverse a long axis of the trench.

10. The method of claim 9, wherein said act of removing comprises laser machining.

11. The method of claim 9, wherein said act of removing comprises a single removal process.

12. The method of claim 9, wherein said act of removing comprises multiple removal processes.

13. The method of claim 9, wherein said act of removing comprises a first removal process from a first side of the substrate and a second removal process from a second different side of the substrate.

14. A method comprising:

removing substrate material to form a trench through less than an entirety of the thickness of a substrate; and, connecting a plurality of slots to the trench to form a compound slot through the substrate wherein said trench is wider at portions proximate to said slots than at portions more distant to said slots.

15. The method of claim 14, wherein said act of connecting comprises connecting the plurality of slots, wherein individual slots are wider than a maximum width of the trench.

16. A method comprising:

forming a trench through less than an entirety of the thickness of a substrate, wherein the trench has a depth which alternates along a long axis of the trench between adjacent shallower and deeper areas; and, connecting a plurality of slots to the deeper portions of the trench to form a compound slot through the substrate.

17. The method of claim 16, wherein the act of forming a trench is achieved from a first side of the substrate and the act of connecting is achieved from a second generally opposite side of the substrate.

18. The method of claim 16, wherein said act of forming a trench and the act of connecting are achieved utilizing a single substrate removal process.

19. A method comprising:

removing substrate material to form a compound fluid feed slot through a substrate, wherein said compound fluid feed slot comprises a trench connected to multiple slots and wherein the trench has varying cross-sectional areas when viewed transverse a long axis of the trench; and, incorporating the substrate into a print cartridge.

20. The method of claim 19, wherein the act of incorporating configures the plurality of slots to receive ink from a cartridge body of the print cartridge and supply the ink to the trench for delivery to ejection chambers of the print cartridge.

21. The method of claim 19, wherein the act of incorporating promotes bubbles migrating from the trench to the slots and into a body of the print cartridge.

22. The method of claim 21, wherein the act of migrating is caused, at least in part, by the bubbles moving toward areas of the substrate which decrease an energy state of the bubbles.

* * * * *